(12) United States Patent
Hashimoto

(10) Patent No.: US 12,540,234 B2
(45) Date of Patent: *Feb. 3, 2026

(54) RUBBER COMPOSITION AND PNEUMATIC TIRE

(71) Applicant: Toyo Tire Corporation, Itami (JP)

(72) Inventor: Akari Hashimoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 2 days.

This patent is subject to a terminal disclaimer.

(21) Appl. No.: 18/529,536

(22) Filed: Dec. 5, 2023

(65) Prior Publication Data

US 2024/0218166 A1 Jul. 4, 2024

(30) Foreign Application Priority Data

Dec. 28, 2022 (JP) .................................. 2022-211074

(51) Int. Cl.
*C08L 9/00* (2006.01)

(52) U.S. Cl.
CPC .............. *C08L 9/00* (2013.01); *C08L 2201/08* (2013.01); *C08L 2205/03* (2013.01)

(58) Field of Classification Search
CPC ..... B60C 1/00; C08L 7/00; C08L 9/00; C08L 97/00; C08K 5/13
See application file for complete search history.

(56) References Cited

U.S. PATENT DOCUMENTS

| | | | |
|---|---|---|---|
| 2001/0043957 A1 | 11/2001 | Mann | |
| 2017/0058110 A1 | 3/2017 | Nishimura | |
| 2020/0391550 A1 | 12/2020 | Sawaki et al. | |
| 2021/0087356 A1 | 3/2021 | Thuilliez et al. | |
| 2021/0087366 A1 | 3/2021 | Thuilliez et al. | |
| 2021/0332222 A1* | 10/2021 | Zhu ........................ | C08L 7/00 |
| 2023/0192932 A1 | 6/2023 | Hasimoto | |
| 2024/0050924 A1* | 2/2024 | Kirchhoff .......... | C08G 73/0206 |
| 2024/0218166 A1 | 7/2024 | Hashimoto | |

FOREIGN PATENT DOCUMENTS

| | | | | |
|---|---|---|---|---|
| CA | 3181270 A1 * | 12/2021 | .............. | B60C 1/00 |
| JP | 58002337 A * | 1/1983 | | |
| JP | 2010-59327 A | 3/2010 | | |
| JP | 2011-063718 A | 3/2011 | | |
| JP | 2012-229357 A | 11/2012 | | |
| JP | 2019-210488 A | 12/2019 | | |
| JP | 2021-507038 A | 2/2021 | | |
| JP | 2021-195491 A | 12/2021 | | |
| JP | 2023-089553 A | 6/2023 | | |
| JP | 7511393 B2 | 7/2024 | | |
| WO | WO-2010000294 A1 * | 1/2010 | .......... | B60C 1/0016 |
| WO | 2019122586 A1 | 6/2019 | | |

OTHER PUBLICATIONS

Non-Final Office Action dated May 15, 2025, issued in U.S. Appl. No. 17/982,659 (19 pages).
Office Action dated Sep. 10, 2025, issued in counterpart JP application No. 2021-204141, with English translation. (8 pages).
Final Office Action dated Sep. 4, 2025 issued in U.S. Appl. No. 17/982,659 (15 pages).
Extended European Search Report dated Nov. 11, 2025, issued in application No. 25184115.1 which is counterpart to related U.S. Appl. No. 19/247,463 (9 pages).
Extended European Search Report dated Nov. 11, 2025, issued in application No. 25184113.6 which is counterpart to related U.S. Appl. No. 19/248,697 (9 pages).
Extended European Search Report dated Nov. 7, 2025, issued in application No. 25184110.2 which is counterpart to related U.S. Appl. No. 19/241,677 (9 pages).
Extended European Search Report dated Nov. 11, 2025, issued in application No. 25184103.7 which is counterpart to related U.S. Appl. No. 19/241,699 (9 pages).
Non-Final Office Action dated Dec. 16, 2025, issued in U.S. Appl. No. 17/982,659 (18 pages).

* cited by examiner

*Primary Examiner* — Mark S Kaucher
(74) *Attorney, Agent, or Firm* — WHDA, LLP

(57) ABSTRACT

A rubber composition containing, when a total amount of a rubber component is taken as 100 parts by mass, 0.5 to 6 parts by mass of a compound represented by the following general formula (1):

[Formula 1]

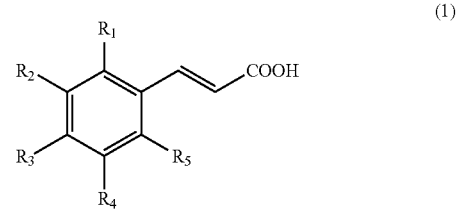

(1)

wherein at least one of $R_1$ to $R_5$ is an —OH group or an —OCH$_3$ group and others are each an —H group or a hydrocarbon group having 1 to 20 carbon atoms) and 0.5 to 6 parts by mass of a lignin-based antiaging agent.

2 Claims, No Drawings

RUBBER COMPOSITION AND PNEUMATIC TIRE

BACKGROUND OF THE INVENTION

Field of the Invention

The present invention relates to a rubber composition and a pneumatic tire including a rubber part containing a vulcanized rubber of the rubber composition.

Description of the Related Art

A rubber product including a rubber part, such as a pneumatic tire or a rubber vibration insulator, may generally deteriorate in durability during long-term use as a result of the occurrence of cracking caused by deterioration by oxygen or ozone in the air. Therefore, various antiaging agents are added to a rubber composition used as a raw material to prevent oxidation deterioration or ozone deterioration of the rubber part.

Patent Document 1 mentioned below discloses a rubber composition obtained by blending 0.5 parts by weight of an amine-based antiaging agent and 0.5 to 8 parts by weight of a polyphenol-based compound with 100 parts by weight of a rubber component containing a diene-based rubber.

Meanwhile, Patent Document 2 mentioned below discloses a tread rubber composition for studless tires which contains a rubber component containing an isoprene-based rubber and a conjugated diene-based polymer, a water-soluble fine particle, and a liquid plasticizer, the liquid plasticizer being present in an amount of 30 parts by mass or less per 100 parts by mass of the rubber component.

PRIOR ART DOCUMENTS

Patent Documents

Patent Document 1: JP-A-2010-59327
Patent Document 2: JP-A-2019-210488

SUMMARY OF THE INVENTION

However, as a result of intensive studies, the present inventor has found that the rubber composition disclosed in Patent Document 1 mentioned above has room for improvement to further improve the heat aging resistance of a resultant vulcanized rubber.

It should be noted that Patent Document 2 mentioned above discloses a lignin derivative as an example of the water-soluble fine particle blended in the rubber composition to improve performance on ice, but there is no description and suggestion about the effect of the lignin derivative on the heat aging resistance of the vulcanized rubber.

The present invention has been accomplished in light of the above circumstances, and an object thereof is to provide a rubber composition as a raw material of a vulcanized rubber excellent in heat aging resistance while reducing an impact on the global environment, and a pneumatic tire including a rubber part containing a vulcanized rubber of the rubber composition.

The above object can be achieved by the present invention as described below. Specifically, the present invention relates to a rubber composition (1) containing, when a total amount of a rubber component is taken as 100 parts by mass, 0.5 to 6 parts by mass of a compound represented by the following general formula (1):

[Formula 1]

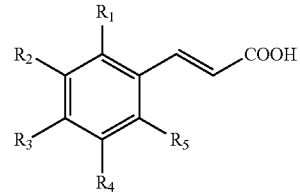

wherein at least one of $R_1$ to $R_5$ is an —OH group or an —OCH$_3$ group and others are each an —H group or a hydrocarbon group having 1 to 20 carbon atoms, and 0.5 to 6 parts by mass of a lignin-based antiaging agent.

The rubber composition (1) is preferably a rubber composition (2) in which the compound represented by the general formula (1) is a compound represented by the following general formula (2).

[Formula 2]

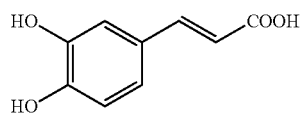

The rubber composition (1) is preferably a rubber composition (3) in which the compound represented by the general formula (1) is a compound represented by the following general formula (3).

[Formula 3]

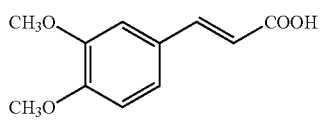

The present invention also relates to a pneumatic tire (4) including a rubber part containing a vulcanized rubber of any one of the rubber compositions (1) to (3).

The rubber composition according to the present invention contains predetermined amounts of a naturally occurring compound represented by the above general formula (1) and a lignin-based antiaging agent. Therefore, the rubber composition can be a raw material of a vulcanized rubber excellent in heat aging resistance while an impact on the global environment is reduced. It should be noted that a reason why a vulcanized rubber of the rubber composition according to the present invention is excellent in heat aging resistance is not clear but can be estimated as follows. The compound represented by the general formula (1) is considered to have, in addition to the function of a conventional phenol-based antiaging agent, that is, the function of stabilizing a rubber molecule due to the addition of an H radical to the rubber molecule by an —OH group, an antiaging function fulfilled by an —OH group in the carboxylic acid (—COOH group). Specifically, an —OH group in the carboxylic acid (—COOH group) adds a hydrogen radical to a radical generated in a rubber molecule to stabilize the rubber molecule, and the carboxylic acid (—COOH group) itself can stably be present as a —COO radical even after hydrogen radical addition. The rubber composition according to the present invention uses the compound represented by the general formula (1) and the lignin-based antiaging agent in combination, and the lignin-based antiaging agent has a large number of —OH groups in its compound. Therefore, after the compound represented by the general formula (1) becomes a —COO radical due to the addition of a hydrogen radical to a radical generated in a rubber molecule, an —OH group in the lignin-based antiaging agent supplies a hydrogen radical to the —COO radical of the compound represented by the general formula (1) so that the carboxylic acid (—COOH group) as the compound represented by the general formula (1) is regenerated. As a result, the effect of improving the heat aging resistance of rubber molecules obtained by the compound represented by the general formula (1) is further enhanced by the presence of the lignin-based antiaging agent. That is, it is considered that coexistence of the compound represented by the general formula (1) and the lignin-based antiaging agent prevents radical generation in rubber molecules so that the heat aging resistance of a resultant vulcanized rubber can significantly be improved.

Particularly, the reason why the heat aging resistance of a resultant vulcanized rubber is improved when the compound represented by the general formula (1) is 3,4-dihydroxycinnamic acid that is the compound represented by the general formula (2) or 3,4-dimethoxycinnamic acid that is the compound represented by the general formula (3) is not clear, but for example, the following reasons (1) to (3) can be considered:

(1) when 3,4-dihydroxycinnamic acid or 3,4-dimethoxycinnamic acid and a zinc compound such as zinc oxide are added to the rubber composition used as a raw material, two or more molecules of 3,4-dihydroxycinnamic acid or 3,4-dimethoxycinnamic acid coordinate to zinc through hydroxy groups or methoxy groups at $R_2$ and $R_3$ positions in the rubber composition so that the molecular weight increases due to the formation of a complex;

(2) formation of a complex of two or more molecules of 3,4-dihydroxycinnamic acid or 3,4-dimethoxycinnamic acid allows 3,4-dihydroxycinnamic acid or 3,4-dimethoxycinnamic acid to remain in the rubber composition and the vulcanized rubber without blooming; and (3) prevention of blooming of 3,4-dihydroxycinnamic acid or 3,4-dimethoxycinnamic acid in the rubber composition or the vulcanized rubber allows 3,4-dihydroxycinnamic acid or 3,4-dimethoxycinnamic acid to effectively exert its antioxidative effect so that the heat aging resistance of the vulcanized rubber improves.

DETAILED DESCRIPTION OF THE PREFERRED EMBODIMENTS

A rubber composition according to the present invention contains a compound represented by the following general formula (1):

[Formula 4]

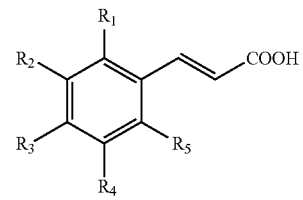

(1)

wherein at least one of $R_1$ to $R_5$ is an —OH group or an —OCH$_3$ group and others are each an —H group or a hydrocarbon group having 1 to 20 carbon atoms). From the viewpoint of improving the heat aging resistance of a resultant vulcanized rubber, the content of the compound represented by the general formula (1) in the rubber composition is 0.5 to 6 parts by mass, preferably 2 to 5 parts by mass when the total amount of a rubber component is taken as 100 parts by mass.

The compound represented by the general formula (1) is a naturally occurring product. Particularly, the compound represented by the general formula (1) is particularly preferably 3,4-dihydroxycinnamic acid that is a compound represented by the following general formula (2):

[Formula 5]

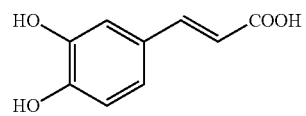

(2)

or 3,4-dimethoxycinnamic acid that is a compound represented by the following general formula (3):

[Formula 6]

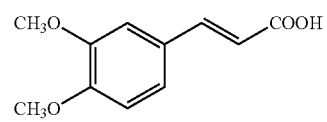

(3)

because these compounds are naturally occurring products, and in addition to that, the heat aging resistance of a resultant vulcanized rubber improves.

It is said that a lignin-based antiaging agent consists of a phenylpropane-type carbon skeleton in which three carbon atoms are attached to a benzene ring, and is a polymer having a molecular weight of 50,000 or more and a dendritic structure formed by side chain-to side chain and benzene ring-to side chain bonding of a large number of the phenylprpopane-type carbon skeletons. Such a lignin-based antiaging agent has a very large number of —OH groups. In the present invention, for example, a compound derived from broad-leaf trees, such as one disclosed in EP3978681A1, obtained in the pulp and paper industry can be used as the lignin-based antiaging agent. From the viewpoint of improving the heat aging resistance of a resultant vulcanized rubber, the content of the lignin-based antiaging agent in the rubber composition is 0.5 to 6 parts by mass, preferably 2 to 5 parts by mass when the total amount of a rubber component is taken as 100 parts by mass.

The reason why the heat aging resistance of a vulcanized rubber of the rubber composition according to the present invention is improved is considered to be interaction between the compound represented by the general formula (1) and the lignin-based antiaging agent. In order to more effectively enhance the interaction to further improve the heat aging resistance of the vulcanized rubber, the blending ratio between the compound represented by the general formula (1) and the lignin-based antiaging agent is preferably 1:1 to 10:1 or 1:1 to 1:10, more preferably 1:1 to 2.5:1.

As the rubber component contained in the rubber composition according to the present invention, for example, a diene-based rubber can suitably be used. Examples of the diene-based rubber include, but are not limited to, natural rubber (NR), isoprene rubber (IR), butadiene rubber (BR), styrene-butadiene rubber (SBR), acrylonitrile-butadiene rubber (NBR), chloroprene rubber (CR), styrene-isoprene copolymer rubber, a butadiene-isoprene copolymer, and styrene-isoprene-butadiene copolymer rubber. These butadiene-based rubbers may be used singly or in combination of two or more of them. The diene-based rubber is preferably natural rubber, isoprene rubber, butadiene rubber, styrene-butadiene rubber, or a blend of two or more of them.

The rubber composition according to the present invention preferably contains carbon black as a filler. Examples of the carbon black that can be used include: carbon blacks usually used in the rubber industry, such as SAF, ISAF, HAF, FEF, and GPF; and conductive carbon blacks such as acetylene black and ketjen black.

Further, silica is preferably contained as a filler. Examples of the silica to be used include silicas usually used for rubber reinforcement, such as wet silica, dry silica, sol-gel silica, and surface-treated silica. Among these, wet silica is preferred.

When silica is contained as a filler, a silane coupling agent is also preferably contained. The silane coupling agent is not limited as long as sulfur is contained in the molecule thereof, and various silane coupling agents to be added to rubber compositions together with silica may be used. Examples of such silane coupling agents include: sulfidesilanes such as bis(3-triethoxysilylpropyl) tetrasulfide (e.g., "Si69" manufactured by Degussa), bis(3-triethoxysilylpropyl) disulfide (e.g., "Si75" manufactured by Degussa), bis(2-triethoxysilylethyl)tetrasulfide, bis(4-triethoxysilylbutyl)disulfide, bis(3-trimethoxysilylpropyl) tetrasulfide, and bis(2-trimethoxysilylethyl)disulfide; mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane; and protected mercaptosilanes such as 3-octanoylthio-1-propyltriethoxysilane and 3-propionylthiopropyltrimethoxysilane.

The rubber composition according to the present invention may further contain, in addition to the rubber component, the compound represented by the general formula (1), the lignin-based antiaging agent, and the filler such as carbon black or silica, a vulcanization-type compounding agent, an antiaging agent, zinc oxide, stearic acid, a softening agent such as wax or oil, a processing aid, etc.

As a vulcanizing agent, sulfur can suitably be used. The sulfur may be ordinary sulfur for rubber, and sulfur such as powdered sulfur, precipitated sulfur, insoluble sulfur, or highly dispersible sulfur can be used.

Examples of a vulcanization accelerator include vulcanization accelerators usually used for rubber vulcanization, such as a sulfenamide-based vulcanization accelerator, a thiuram-based vulcanization accelerator, a thiazole-based vulcanization accelerator, a thiourea-based vulcanization accelerator, a guanidine-based vulcanization accelerator, and a dithiocarbamic acid salt-based vulcanization accelerator, and these may be used singly or in an appropriate combination of two or more of them. However, in the present invention, a sulfenamide-based vulcanization accelerator is preferably used because of its excellent property of reinforcing a vulcanized rubber and its excellent peeling resistance between a rubber for coating and a steel cord.

The rubber composition according to the present invention is characterized in that it contains, as an antiaging agent, the compound represented by the general formula (1) and the lignin-based antiaging agent, but may use an antiaging agent other than the compound represented by the general formula (1) and the lignin-based antiaging agent in combination with them. Examples of the antiaging agent other than the compound represented by the general formula (1) include antiaging agents usually used for rubber, such as an aromatic amine-based antiaging agent, an amine-ketone-based antiaging agent, a monophenol-based antiaging agent, a bisphenol-based antiaging agent, a polyphenol-based antiaging agent, a dithiocarbamic acid salt-based antiaging agent, and a thiourea-based antiaging agent, and these may be used singly or in an appropriate combination of two or more of them.

The rubber composition according to the present invention is obtained by kneading the rubber component, the compound represented by the general formula (1), the lignin-based antiaging agent, the filler, the vulcanizing agent, the vulcanization accelerator, the antiaging agent, stearic acid, the softener such as wax or oil, the processing aid, etc. with the use of a kneading machine usually used in the rubber industry, such as a Banbury mixer, a kneader, or a roll.

A method for blending the above components is not limited, and any one of the following methods may be used: a method in which components to be blended other than vulcanization-type compounding agents such as a vulcanizing agent and a vulcanization accelerator are previously kneaded to prepare a master batch, the remaining components are added to the master batch, and the resultant is further kneaded, a method in which components are added in any order and kneaded, and a method in which all the components are added at the same time and kneaded.

Examples

Hereinbelow, the configuration and effect of the present invention will be described with reference to specific examples etc.

(Preparation of Rubber Compositions)

Rubber compositions of Examples 1 to 7 and Comparative Examples 1 and 2 were prepared according to formulations shown in Table 1 and kneaded using a usual Banbury mixer. Compounding agents listed in Table 1 are shown below (in Table 1, the amount of each of the compounding agents added is expressed in parts by mass per 100 parts by mass of the rubber component).

a) Natural rubber (RSS #3)
b) Butadiene rubber: trade name "BR150B", manufactured by UBE Corporation
c) Carbon black: trade name "SEAST 3", manufactured by TOKAI CARBON CO., LTD.

d) Stearic acid: trade name "LUNAC S-20", manufactured by Kao Corporation
e) Zinc oxide: trade name "Zinc White #3", manufactured by MITSUI MINING & SMELTING CO., LTD.
f) Wax: trade name "OZOACE 0355", manufactured by Nippon Seiro Co., Ltd.
g) Oil: trade name "Process NC140", manufactured by JOMO
h) Antiaging agent A (2,2,4-trimethyl-1,2-dihydroquinoline polymer that is an amine-ketone-based antiaging agent): trade name "NOCRAC 224", manufactured by OUCHI SHINKO CHEMICAL INDUSTRIAL CO., LTD.
i) Antiaging agent B (N-phenyl-N'-(1,3-dimethylbutyl)-p-phenylenediamine that is an aromatic secondary amine-based antiaging agent): trade name "NOCRAC 6C", manufactured by OUCHI SHINKO CHEMICAL INDUSTRIAL CO., LTD
j) 3,4-dimethoxycinnamic acid that is a compound represented by the general formula (3): product name "3,4-Dimethoxycinnamic Acid", manufactured by Tokyo Chemical Industry Co., Ltd.
k) Lignin-based antiaging agent
l) Sulfur: trade name "Powder Sulfur", manufactured by Tsurumi Chemical Industry Co., ltd.
g) Vulcanization accelerator: trade name "SOXINOL CZ", SUMITOMO CHEMICAL COMPANY, LIMITED The rubber compositions of Examples 1 to 7 and Comparative Examples 1 and 2 were heated and vulcanized at 160° C. for 20 minutes using predetermined molds, and the heat aging resistance of the thus obtained sample rubbers was evaluated by the following method.

(Heat Aging Resistance of Vulcanized Rubbers)

In accordance with JIS K6253, the sample rubbers were aged by being left to stand in a Geer oven for a predetermine time, and their breaking elongation retention rates (percentages of retention of breaking elongation after aging relative to initial breaking elongation) were measured. In Table 1, the breaking elongation retention rate is expressed as an index relative to the retention rate of Comparative Example 1 regarded as 100. A larger index means higher heat aging resistance. The results are shown in Table 1.

(Property of Reinforcing Vulcanized Rubber)

A tensile test (dumbbell-shaped specimen type 3) was performed in accordance with JIS K6251 to measure rupture strength. The rupture strength was expressed as an index relative to the rupture strength of Comparative Example 1 regarded as 100. A larger index indicates that the reinforcing property is more excellent.

TABLE 1

|  | Comparative Example 1 | Comparative Example 2 | Example 1 | Example 2 | Example 3 | Example 4 | Example 5 | Example 6 | Example 7 |
|---|---|---|---|---|---|---|---|---|---|
| (Formulation) | | | | | | | | | |
| Natural rubber | 40 | 40 | 40 | 40 | 40 | 40 | 40 | 40 | 40 |
| Butadiene rubber | 60 | 60 | 60 | 60 | 60 | 60 | 60 | 60 | 60 |
| Carbon black | 50 | 50 | 50 | 50 | 50 | 50 | 50 | 50 | 50 |
| Stearic acid | 2 | 2 | 2 | 2 | 2 | 2 | 2 | 2 | 2 |
| Zinc oxide | 3 | 3 | 3 | 3 | 3 | 3 | 3 | 3 | 3 |
| Wax | 2 | 2 | 2 | 2 | 2 | 2 | 2 | 2 | 2 |
| Oil | 10 | 10 | 10 | 10 | 10 | 10 | 10 | 10 | 10 |
| Antiaging agent A | 2 | 2 | — | — | — | — | — | — | — |
| Antiaging agent B | 2 | — | — | — | — | — | — | — | — |
| 3, 4-dimethoxycinnamic acid | — | — | 5 | 0.5 | 2 | 5 | 0.5 | 2 | 5 |
| Lignin-based antiaging agent | — | 2 | 0.5 | 2 | 2 | 2 | 5 | 5 | 5 |
| Sulfur | 2 | 2 | 2 | 2 | 2 | 2 | 2 | 2 | 2 |
| Vulcanization accelerator | 1 | 1 | 1 | 1 | 1 | 1 | 1 | 1 | 1 |
| (Evaluation) | | | | | | | | | |
| (Heat aging resistance) | 100 | 95 | 100 | 110 | 108 | 114 | 107 | 108 | 112 |
| (Rupture strength) | 100 | 98 | 130 | 109 | 120 | 115 | 100 | 109 | 106 |

As can be seen from the results shown in Table 1, the vulcanized rubbers of the rubber compositions according to Examples 1 to 7 are superior in heat aging resistance to the vulcanized rubber of the rubber composition according to Comparative Example 1. It should be noted that in the case of the rubber composition according to Comparative Example 2, the heat aging resistance of the vulcanized rubber deteriorated in spite of the fact that the amine-based antiaging agent and the lignin-based antiaging agent were used in combination. This indicates that a vulcanized rubber of the rubber composition according to the present invention has improved heat aging resistance due to interaction between the compound represented by the general formula (1) and the lignin-based antiaging agent.

What is claimed is:

1. A rubber composition containing, when a total amount of a rubber component is taken as 100 parts by mass, 0.5 to 6 parts by mass of a compound represented by the following general formula (3):

[Formula 3]

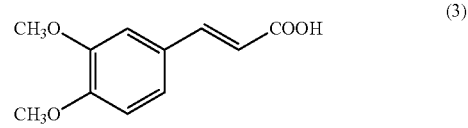

(3)

and 0.5 to 6 parts by mass of a lignin-based antiaging agent.

2. A pneumatic tire comprising a rubber part containing a vulcanized rubber of the rubber composition according to claim 1.

* * * * *